United States Patent
Chauvet

(10) Patent No.: US 10,019,893 B2
(45) Date of Patent: Jul. 10, 2018

(54) APPARATUS FOR WIRELESS TRANSMISSION OF CONTROL DATA

(71) Applicant: CHAUVET & SONS, LLC, Wilmington, DE (US)

(72) Inventor: Albert Chauvet, Plantation, FL (US)

(73) Assignee: Chauvet & Sons, LLC, Wilmington, DE (US)

(*) Notice: Subject to any disclaimer, the term of this patent is extended or adjusted under 35 U.S.C. 154(b) by 0 days.

(21) Appl. No.: 15/234,681

(22) Filed: Aug. 11, 2016

(65) Prior Publication Data

US 2018/0047281 A1 Feb. 15, 2018

(51) Int. Cl.
| | |
|---|---|
| G08C 17/02 | (2006.01) |
| G06F 13/40 | (2006.01) |
| H05B 37/02 | (2006.01) |
| G06F 13/42 | (2006.01) |
| G06F 13/38 | (2006.01) |

(52) U.S. Cl.
CPC ............ *G08C 17/02* (2013.01); *G06F 13/387* (2013.01); *G06F 13/4022* (2013.01); *G06F 13/4282* (2013.01); *H05B 37/0272* (2013.01)

(58) Field of Classification Search
CPC ............ F21V 17/002; F21W 2131/406; H05B 33/086; H05B 37/0272; G06K 7/1417; G06F 13/387; G06F 13/4022; G06F 13/4282; H04L 29/06068; H04L 29/08018; G08C 17/02

USPC ............................................ 340/12.5; 710/11
See application file for complete search history.

(56) References Cited

U.S. PATENT DOCUMENTS

| | | | | |
|---|---|---|---|---|
| 2014/0104830 A1* | 4/2014 | Velazquez | ............ | F21V 17/002 362/232 |
| 2015/0278137 A1* | 10/2015 | Gan | ...................... | G06F 13/387 710/11 |
| 2015/0312994 A1* | 10/2015 | Leung | ................ | H05B 37/0272 315/151 |
| 2017/0135165 A1* | 5/2017 | Lu | ........................ | H05B 33/086 |

FOREIGN PATENT DOCUMENTS

CN 104902655 A 9/2015

* cited by examiner

*Primary Examiner* — Ali Neyzari
(74) *Attorney, Agent, or Firm* — Laurence A. Greenberg; Werner H. Stemer; Ralph E. Locher

(57) ABSTRACT

A wireless communications module including control circuitry disposed within a housing of a USB device or dongle is provided. The wireless communications module includes a USB connector for connecting the control circuitry of the wireless transceiver to control circuitry of a DMX enabled device via a USB port of the DMX enabled device. The wireless communications module further includes a wireless transceiver configured to wirelessly transmit control signals from the DMX enabled device to a wireless communications module of another DMX enabled device.

15 Claims, 1 Drawing Sheet

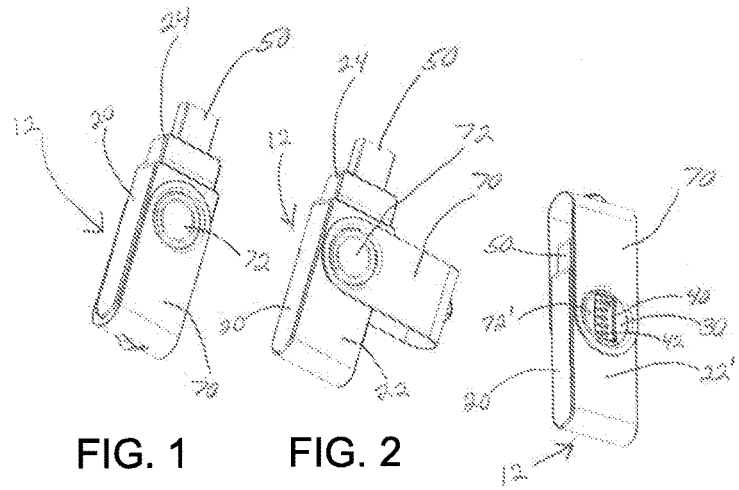
FIG. 1  FIG. 2
FIG. 3
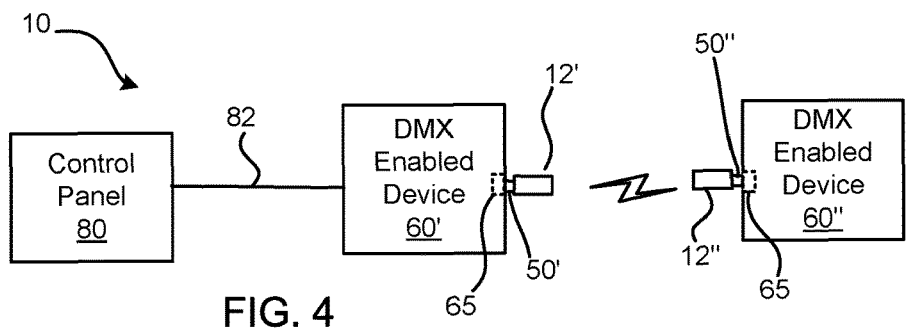
FIG. 4
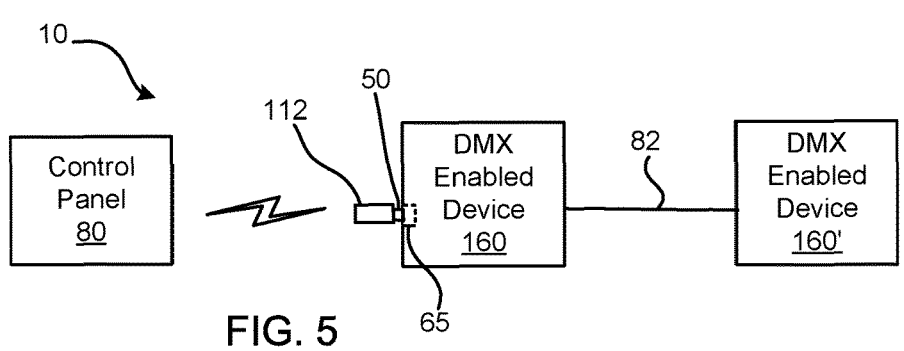
FIG. 5
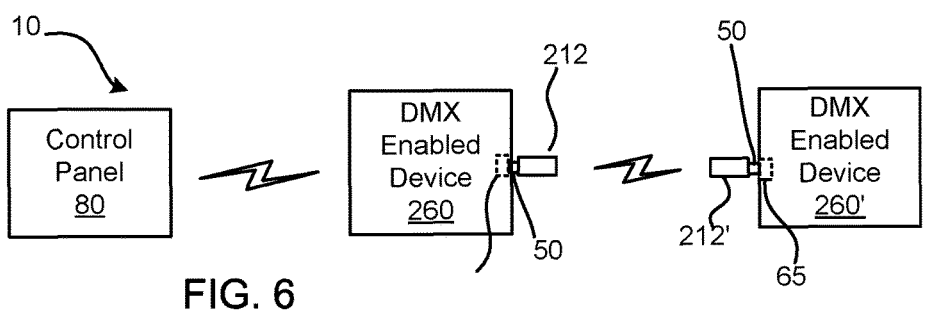
FIG. 6

APPARATUS FOR WIRELESS TRANSMISSION OF CONTROL DATA

BACKGROUND OF THE INVENTION

Field of the Invention

The present invention relates to digital communication and, more particularly, to a system and apparatus capable of selectively transmitting or receiving wireless data signals.

Description of the Related Art

The use of lighting and other effects for events and applications has increased greatly over recent years. Today, most events, such as concerts, theatrical shows, trade shows, corporate events, weddings and other parties and events, use lighting and other effects in some manner. The lighting and effects equipment are, typically, either programmed individually or controlled from one or more control panels through the use of a data control protocol.

DMX (digital multiplexing protocol) is a standard data control protocol for digital communication commonly used to control lighting and theatrical effect equipment. DMX allows the operator to control, among other things, the movement, intensity and color of lights, and the operation of atmospheric equipment, such as fog machines.

The control panels are typically connected to the controllable lighting and effects equipment via cables. The number of cables required depends upon the number of fixtures to be connected to the control panel and the lengths of the cables vary depending upon the proximity of the fixtures to the control panels. For some events, many cables are used and many of the cables used are several hundred feet long.

Because every event and venue is different, companies that supply lighting and effects fixtures for events must maintain many different cables of different sizes and must transport those cables to each event. The cables can be very expensive to purchase and the resources (storage space, manpower and travel cases) required to store and transport the cables to each event can also be costly. Accordingly, there is a need for means to wirelessly connect the fixtures to the control panels.

A number of devices have been introduced that are capable of wireless transmission of DMX signals to fixtures. However, these prior art devices each have limitations that adversely impact their effectiveness and commercial viability. For instance, prior art wireless DMX devices require their own power supply to power the wireless DMX device. The need for the power supply adds additional size, weight and cost to the wireless DMX device, as well as the need to plug it into an electrical power source.

In addition, the prior art devices designed for connection to a fixture, are structured to either receive or transmit DMX signals, but cannot be selectively set to either receive or transmit.

Additionally, the prior art devices are structured so that one device wirelessly transmits DMX signals from the control panel to one or more receiving devices connected to fixtures via a DMX connector. Other fixtures are then connected by standard DMX cables in series to the fixture or fixtures receiving the wireless DMX signal. This requires multiple devices (at least one transmitter and one receiver) and still requires the use of cables to connect the fixtures not receiving the wireless DMX signals. Therefore, although the prior art devices eliminate the need for cables between the control panel and the fixture receiving the wireless DMX signal, cables are still required to get the DMX signal to all of the other fixtures.

Accordingly, there is a need in the art for a new and improved system and apparatus for wirelessly transmitting DMX and other data signals to and from light fixtures and other equipment. Any such apparatus should be capable of using the power from the fixture or other effect equipment, thereby negating the need for a separate power supply. Any such apparatus should be further capable of selectively receiving or transmitting the control signal. The present invention is particularly suited to overcome those problems that remain in the art in a manner not previously known or contemplated.

BRIEF SUMMARY OF THE INVENTION

It is accordingly an object of the invention to provide a device, system and method for providing DMX control signals from one DMX enabled device to another DMX enabled device. In one particular embodiment of the invention, a wireless communications module including control circuitry is disposed within a housing of a USB device or dongle. The wireless communications module includes a USB connector for connecting the control circuitry of the wireless transceiver to control circuitry of a DMX enabled device, via a USB port of the DMX enabled device. In the present preferred embodiment, the wireless communications module includes a wireless transceiver configured to wirelessly transmit control signals from the DMX enabled device to a wireless communications module of another DMX enabled device.

Although the invention is illustrated and described herein as embodied in an apparatus for wireless transmission of control data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The foregoing background, as well as the following detailed description of the preferred embodiments, is better understood when read in conjunction with the appended drawings. For the purpose of illustrating the invention, there is shown in the drawings an exemplary embodiment that is presently preferred, it being understood however, that the invention is not limited to the specific methods and instrumentality's disclosed. Additionally, like reference numerals represent like items throughout the drawings. In the drawings:

FIG. 1 is side perspective view of the apparatus of the present invention with the swivel cover over the housing and the USB connector accessible;

FIG. 2 is side perspective view of the apparatus of the present invention with the swivel cover rotated off of the housing;

FIG. 3 is side perspective view of the apparatus of the present invention with the swivel cover over the USB connector;

FIG. 4 is an illustrative view of one embodiment of the system and apparatus of the present invention; and FIG. 5 is an illustrative view of one embodiment of the system and apparatus of the present invention.

FIG. 6 is an illustrative view of a further embodiment of the system and apparatus of the present invention.

DETAILED DESCRIPTION OF THE PREFERRED EMBODIMENTS

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Referring now to FIGS. 1-5, the present invention is directed towards a new and improved system 10 for wirelessly transmitting and receiving DMX control data signals and other data signals comprising a wireless DMX transmission apparatus and at least one wireless DMX receiving apparatus. At least one of the transmitting apparatus and receiving apparatus is structured to be connected to a DMX enabled device 60, such as a light fixture, fog machine or other device.

The apparatus 12 connected to the DMX enabled device 60 is a transceiver capable of both receiving wireless DMX signals and transmitting wireless DMX signals. As illustrated in FIGS. 1-3, in one particular preferred embodiment, the transceiver apparatus 12 can take the form of a USB dongle or device, having the appearance of a USB drive or other compact USB device. More particularly, in a first preferred embodiment, the transceiver apparatus 12 includes a generally rectangular-shaped housing 20, control circuitry 30 disposed within the housing 20, at least one switch 40 electrically connected to the control circuitry 30 extending outward through an outer surface 22 of the housing 20, and a USB connector 50 electrically connected to the control circuitry 30 extending outward through an outer edge 24 of the housing 20. A communications module including a USB connector for connection to a USB port of an LED lamp and having at least one switch accessible through a shell housing the communications module is described in Chinese Patent Application No. CN201510370800, published in China on Sep. 9, 2015 as Chinese Patent Application Publication No. CN104902655 A, which Chinese Patent Application is incorporated by reference herein, in its entirety.

The control circuitry 30 is structured to switch between a receiving mode, in which the transceiver apparatus 12 receives wireless DMX signals from a wireless DMX transmitter and communicates the received DMX signals through the USB connector 50 to the DMX enabled device 60, and a transmission mode, in which the transceiver apparatus 12 transmits wireless DMX signals received through the USB connector 50 from the DMX enabled device 60 to a device capable of receiving wireless DMX signals.

In a first preferred embodiment, the switches 40 comprise five DIP (dual in-line package) switches. Each DIP switch may be individually toggled between two positions. One of the DIP switches 42 is structured to switch the control circuitry 30 between the receiving mode and the transmission mode. Specifically, when DIP switch 42 is positioned in the transmit position, the control circuitry 30 is enabled to transmit DMX signals to another device, and when DIP switch 42 is positioned in the receiver position, the control circuitry 30 is enabled to receive DMX signals from another device. The other four DIP switches are structured to set the operating frequency of the wireless transmission. The four DIP switches allow for sixteen different combinations and operating frequencies, which provides the capability to selectively send sixteen different DMX signals to the selective DMX enabled devices 60. Although the transceiver apparatus 12 of the first preferred embodiment uses four dip switches to set distinct transmission frequencies, it should be appreciated that more or less dip switches may be used to allow for more or less frequency options within the spirit and scope of the invention. It should also be appreciated that other types of switches now known or later developed may be used in place of DIP switches 40.

The control circuitry 30 receives power from the DMX enabled device 60 via its USB connector 50. As a result, the transceiver apparatus 12 does not require its own power supply, which enables the transceiver apparatus 12 to maintain the size and configuration of a standard USB flash drive.

The transceiver apparatus 12 also includes a cover 70 structured to be swiveled around raised circular attachment points 72, 72' on opposite sides 22, 22' of the housing 20, between a first position in which the USB connector 50 is fully accessible (FIG. 1) and a second position in which the USB connector 50 is partially covered (FIG. 3). One of the circular attachment points 72' surrounds the switches 40 such that the switches 40 remain accessible at all times when the cover 70 is swiveled.

Referring now to FIG. 4, one preferred embodiment of the system 10 of the present invention is shown. In this configuration, a first transceiver apparatus 12' is connected to a first DMX enabled device 60' via its USB connector 50' and DIP switch 42 on first transceiver apparatus 12' is positioned in the transmission position. A second transceiver apparatus 12" is connected to a second DMX enabled device 60" via its USB connector 50" and DIP switch 42 on second transceiver apparatus 12" is positioned in the receiving position. The first DMX enabled device 60' receives DMX signals from a control panel 80 via a DMX cable 82 connected to the DMX input on the first DMX enabled device 60' and the first transceiver apparatus 12' receives the DMX signal from the first DMX enabled device 60', via the USB connector 50 mated with a USB port 65. The first transceiver apparatus 12' wirelessly transmits the DMX signal to the second transceiver apparatus 12", which is connected to a USB port 65 of the second DMX enabled device 60" via the USB connector 50". The second transceiver apparatus 12" communicates the DMX signal to the second DMX enabled device 60" via the USB connector 50". One or more additional transceiver apparatuses 12" may be connected via their USB connectors 50" to the USB ports 65 of additional DMX enabled devices 60" in this configuration to simultaneously receive the wireless DMX signals from the first transceiver apparatus 12'.

Referring now to FIG. 5, another preferred embodiment of the system 10 of the present invention is shown. In this configuration, a first transceiver apparatus 112 is connected to a first DMX enabled device 160, via its USB connector 50 and a USB port 65 of the first DMX enabled device 160 and the DIP switch 42 on first transceiver apparatus 112 is positioned in the receiving position. The first transceiver apparatus 112 receives wireless DMX signals from a control panel 80. One or more other DMX enabled devices 160' can also receive the wireless DMX signals from the control panel 80 via an additional transceiver apparatus 12 connected to the USB connector of each DMX enabled device 160'. Alternatively, the additional DMX enabled devices 160' can receive the DMX signals via DMX cables 82.

Referring now to FIG. 6, there is shown a further preferred embodiment of the system 10 of the present invention. In this configuration, a control panel 80 wirelessly transmits DMX control data to a first transceiver apparatus 212 of the first DMX enabled device 260. The first transceiver apparatus 212 is one that can both transmit and receive without having to designate a DIP switch on the first transceiver apparatus 212 in either a transmission or receiving position. Rather, such a DIP switch can be used to designate the first transceiver apparatus 212 as a host device (one that can both transmit and receive), or may be omitted entirely. Another transceiver apparatus 212' is connected to a second DMX enabled device 260' via its USB connector 50 mated with a USB port 65 of the second DMX enabled device 260. The transceiver apparatus 212' may be like the first transceiver 212 (capable of both transmission and receipt without designating a DIP switch) or may be a transceiver, as discussed hereinabove, having a DIP switch 42 positioned in the receiving position. The first DMX enabled device 260 receives DMX signals wirelessly from a control panel 80 and wirelessly retransmits the received control data to the transceiver apparatus 212' of the second DMX enabled device 260'. The second transceiver apparatus 212" communicates the DMX signal to the second DMX enabled device 260' via the USB connector 50 mated with the USB port 65. One or more additional transceiver apparatuses 212' may be connected via their USB connectors 50 to USB ports 65 of additional DMX enabled devices 60' in this configuration to simultaneously receive the wireless DMX signals from the first transceiver apparatus 212.

Although the transceiver apparatuses 12, 12', 12", 112, 212, 212' of the preferred embodiments described above are structured to transmit and receive wireless DMX signals, it should be appreciated that the control circuitry 30 could also be structured to wirelessly transmit and receive signals from other communication data protocols, now known or later developed.

The transceiver apparatus 12, 12', 12", 112, 212, 212' described herein is configured for connection to a DMX enabled device 60, 60', 60", 160, 160', 260, 260' via a standard USB connector port. Advantageously, the wireless DMX transceiver apparatuses 12, 12', 12", 112, 212, 212' of the present preferred embodiments are powered by the DMX enabled devices 60, 60', 60", 160, 160', 260, 260', via a USB connector 50, 50', 50" of the transceivers 12, 12', 12", 112, 212, 212' mating with a USB port 65 of the DMX enabled devices 60, 60', 60", 160, 160', 260, 260'. This cures a disadvantage of prior art wireless DMX transceivers that require their own standalone power supplies to operate. In addition, the wireless DMX transceiver apparatuses 12, 12', 12", 112, 212, 212' of the presently described, preferred embodiments are configured for varying and setting the operating frequency to selectively transmit wireless DMX signals to DMX enabled devices 60, 60', 60", 160, 160', 260, 260'.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

I claim:

1. A wireless communications module including control circuitry disposed within a housing, the wireless communications module including at least one switch accessible through the housing for setting a frequency of the wireless communications module and a USB connector for connecting the control circuitry of the wireless transceiver to control circuitry of a first DMX enabled device via a USB port of the DMX enabled device, the wireless communications module comprising:
   a wireless transceiver configured to wirelessly transmit control data from the first DMX enabled device to a wireless communications module of a second DMX enabled device.

2. The wireless communications module of claim 1, wherein the control data is received via a wired connection to said first DMX enabled device.

3. A system configured for wireless communication of DMX control signals, the system comprising:
   a control panel configured to generate DMX signals;
   the first DMX enabled device including control circuitry mated with a wireless communications module according to claim 1, via said USB port of the first DMX enabled device;
   a DMX cable connecting the control panel to the first DMX enabled device, said first DMX enabled device receiving control signals from said control panel over said DMX cable;
   said second DMX enabled device configured to receive DMX signals wirelessly via a second wireless communications module;
   said wireless communications module of said first DMX enabled device configured to wirelessly transmit DMX signals received from said control panel via said DMX cable to said second wireless communications module.

4. The system of claim 3, wherein the second wireless communications module is connected to said USB port of said second DMX enabled device via said USB connector of the second wireless communications module.

5. A method for communicating DMX signals to a DMX enabled device, comprising the steps of:
   providing a control panel configured to generate DMX signals;
   connecting the control panel to the first DMX enabled device via a DMX cable;
   connecting a wireless communications module according to claim 1 to said USB port of the first DMX enabled device;
   receiving DMX signals at the first DMX enabled device via the DMX cable;
   wirelessly transmitting the DMX signals received via the DMX cable to a wireless communications module of a second DMX enabled device using the wireless communications module of the first DMX enabled device; and
   performing a function at the second DMX enabled device based on the control signals.

6. The method of claim 5, wherein the second communications module is connected to control circuitry of the second DMX enabled device via a USB port of the second DMX enabled device.

7. A wireless communications module including control circuitry disposed within a housing, the wireless communications module including at least one switch accessible through the housing for setting a frequency of the wireless communications module and a USB connector for connecting the control circuitry of the wireless transceiver to control circuitry of a first DMX enabled device via a USB port of the DMX enabled device, the wireless communications module comprising:

a wireless transceiver configured to wirelessly receive control data from a control panel and to transmit the received control data from the first DMX enabled device to a wireless communications module of a second DMX enabled device.

8. A system configured for wireless communication of DMX control signals, the system comprising:
  a control panel configured to generate DMX signals;
  a first DMX enabled device including control circuitry mated with a wireless communications module according to claim 7, via said USB port of the first DMX enabled device;
  said control panel configured to wirelessly transmit control signals to the first DMX enabled device;
  said second DMX enabled device configured to receive DMX signals wirelessly via a second wireless communications module;
  said wireless communications module of said first DMX enabled device configured to wirelessly transmit DMX signals received from said control panel via said DMX cable to said second wireless communications module.

9. The system of claim 8, wherein the second wireless communications module is connected to said USB port of said second DMX enabled device via said USB connector of the second wireless communications module.

10. A method for communicating DMX signals to the first DMX enabled device, comprising the steps of:
  providing a control panel configured to generate DMX signals;
  connecting a wireless communications module according to claim 7 to said USB port of the first DMX enabled device;
  receiving DMX signals at the first DMX enabled device wirelessly from the control panel;
  wirelessly transmitting the DMX signals received via the DMX cable to a wireless communications module of a second DMX enabled device using the wireless communications module of the first DMX enabled device; and
  performing a function at the second DMX enabled device based on the control signals.

11. The method of claim 10, wherein the second communications module is connected to control circuitry of the second DMX enabled device via said USB port of the second DMX enabled device.

12. The wireless communications module of claim 1, wherein the control circuitry receives power from first DMX enabled device.

13. The wireless communications module of claim 7, wherein the control circuitry receives power from first DMX enabled device.

14. The wireless communications module of claim 1, wherein the control circuitry and the first DMX enabled device share a common, DMX protocol.

15. The wireless communications module of claim 7, wherein the control circuitry and the first DMX enabled device share a common, DMX protocol.

* * * * *